US008807758B2

(12) United States Patent
Miyazaki

(10) Patent No.: US 8,807,758 B2
(45) Date of Patent: Aug. 19, 2014

(54) LIGHT SOURCE UNIT AND PROJECTOR

(75) Inventor: Takeshi Miyazaki, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 309 days.

(21) Appl. No.: 13/324,107

(22) Filed: Dec. 13, 2011

(65) Prior Publication Data
US 2012/0147331 A1 Jun. 14, 2012

(30) Foreign Application Priority Data

Dec. 14, 2010 (JP) ................. 2010-278193
Oct. 28, 2011 (JP) ................. 2011-236998

(51) Int. Cl.
G03B 21/14 (2006.01)
F21V 9/00 (2006.01)
F21V 7/00 (2006.01)
G02B 26/08 (2006.01)
G02B 26/10 (2006.01)
G02B 27/28 (2006.01)

(52) U.S. Cl.
USPC ............ 353/31; 353/20; 353/84; 362/293; 362/300; 362/301; 359/207.9; 359/485.01; 359/487.01

(58) Field of Classification Search
USPC ............ 353/31, 20, 84; 362/293, 301, 300, 362/112.23, 327; 359/207.9, 485.01, 359/487.01
See application file for complete search history.

(56) References Cited

U.S. PATENT DOCUMENTS

| 8,157,398 | B2 | 4/2012 | Yamamoto |
| 8,231,227 | B2 | 7/2012 | Kurosaki |
| 2010/0182571 | A1 | 7/2010 | Nishikawa et al. |
| 2010/0231863 | A1 | 9/2010 | Hikmet et al. |
| 2010/0238412 | A1* | 9/2010 | Kurosaki ............. 353/31 |
| 2012/0002172 | A1 | 1/2012 | Ikeda et al. |

FOREIGN PATENT DOCUMENTS

| CN | 101592308 A | 12/2009 |
| CN | 101822066 A | 9/2010 |
| CN | 102314060 A | 1/2012 |
| JP | 2004-341105 A | 12/2004 |
| JP | 2006-039277 A | 2/2006 |
| JP | 2006-113336 A | 4/2006 |
| JP | 2006-220762 A | 8/2006 |
| JP | 2007-233371 A | 9/2007 |
| JP | 2010-164802 A | 7/2010 |
| JP | 2010-217566 A | 9/2010 |
| JP | 2010-231063 A | 10/2010 |

OTHER PUBLICATIONS

Japanese Office Action dated Dec. 13, 2012 (and English translation thereof) in counterpart Japanese Application No. 2011-236998.
Chinese Office Action dated Dec. 4, 2013 (and English translation thereof) in counterpart Chinese Application No. 201110416677.X.

* cited by examiner

Primary Examiner — Georgia Y Epps
Assistant Examiner — Magda Cruz
(74) Attorney, Agent, or Firm — Holtz Holtz Goodman & Chick PC

(57) ABSTRACT

A light source unit is provided which includes a first light source which shines excitation light of a predetermined wavelength band; an optical path switching device which switches in a time-sharing fashion the light shone from the first light source into first light which is shone in a first direction and second light which is shone in a second direction; a light emitting plate on which a luminescent material layer is formed which emits luminescent light of a wavelength band which is different from that of the excitation light when receiving the second light; and a light guiding optical system which guides the first light and the luminescent light to the same optical path.

19 Claims, 14 Drawing Sheets

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2010-278193 filed on Dec. 14, 2010 and Japanese Patent Application No. 2011-236998 filed on Oct. 28, 2011, the entire disclosure of which, including the description, claims, drawings and abstract, is to be incorporated herein by reference.

BACKGROUND OF THE INVENTION

1. Field of the Invention

The present invention relates to a light source unit and a projector.

2. Description of the Related Art

In these days, data projectors are used on many occasions as image projection units which project images including images of screens of personal computers and video images, as well as images based on image data which is stored in memory cards on to a screen. In these projectors, light emitted from a light source is collected on to a micromirror display device called a digital micromirror device (DMD) or a liquid crystal plate for projection on to a screen as color images.

Conventionally, the mainstream of these projectors has been those which use a high-intensity discharge lamp as a light source. However, in recent years, there have been made many developments and proposals on projectors which use, as a light source, red, green and blue light emitting diodes or a solid light emitting device such as a device utilizing organic EL technology.

For example, Japanese Unexamined Patent Publication No. 2004-341105 (JP-A-2004-341105) proposes a method for generating light of a plurality of colors by coating a substrate with different types of luminescent materials which emit light of different wavelengths, rotating the substrate and shining ultraviolet excitation light on to the rotating substrate.

In JP-A-2004-341105, however, the time-sharing ratio for each color is determined simply by an angle at which the substrate is coated with the luminescent material corresponding to that color. Therefore, for example, the angles at which the substrate is coated with the luminescent materials cannot be changed to arbitrary angles during the operation of the projector. Thus, in order to control the variation in quantity of light for each color during the operation of the projector, substrates which are coated with luminescent materials at different angles have had to be replaced.

BRIEF SUMMARY OF THE INVENTION

The invention has been made in view of the problem inherent in the related art, and an object thereof is to provide a light source unit which can solve the problem and a projector which includes the light source unit.

According to a first aspect of the invention, there is provided a light source unit including:

a first light source which shines excitation light of a predetermined wavelength band;

an optical path switching device which switches in a time-sharing fashion the light shone from the primary light source into first light which is shone in a first direction and second light which is shone in a second direction;

a light emitting plate on which is formed a luminescent material layer which emits luminescent light of a wavelength band which is different from that of the excitation light when receiving the second light; and a light guiding optical system which guides the first light and the luminescent light to the same optical path.

According to a second aspect of the invention, there is provided a projector including:

the light source unit set forth in the first aspect;

a display device;

a light source side optical system which guides light emitted from the light source unit to the display device;

a projection side optical system which projects an image emitted from the display device on to a screen; and a projector control unit which controls the light source unit and the display device.

Advantages of the invention will be set forth in the following detailed description of the invention or will be obvious from the description. Alternatively, the advantages may be learned through practice of the invention. The advantages of the invention can be realized or obtained by instrumentalities or combinations thereof which will be described in the following description.

BRIEF DESCRIPTION OF THE DRAWINGS

Illustrating embodiments of the invention, the accompanying drawings serve to explain the principles of the invention together with the brief description of the invention made above and the detailed description of embodiments thereof which will be made below.

DETAILED DESCRIPTION OF THE PREFERRED EMBODIMENTS

Hereinafter, embodiments of the invention will be described by reference to the accompanying drawings.

First Embodiment

Figure 1:
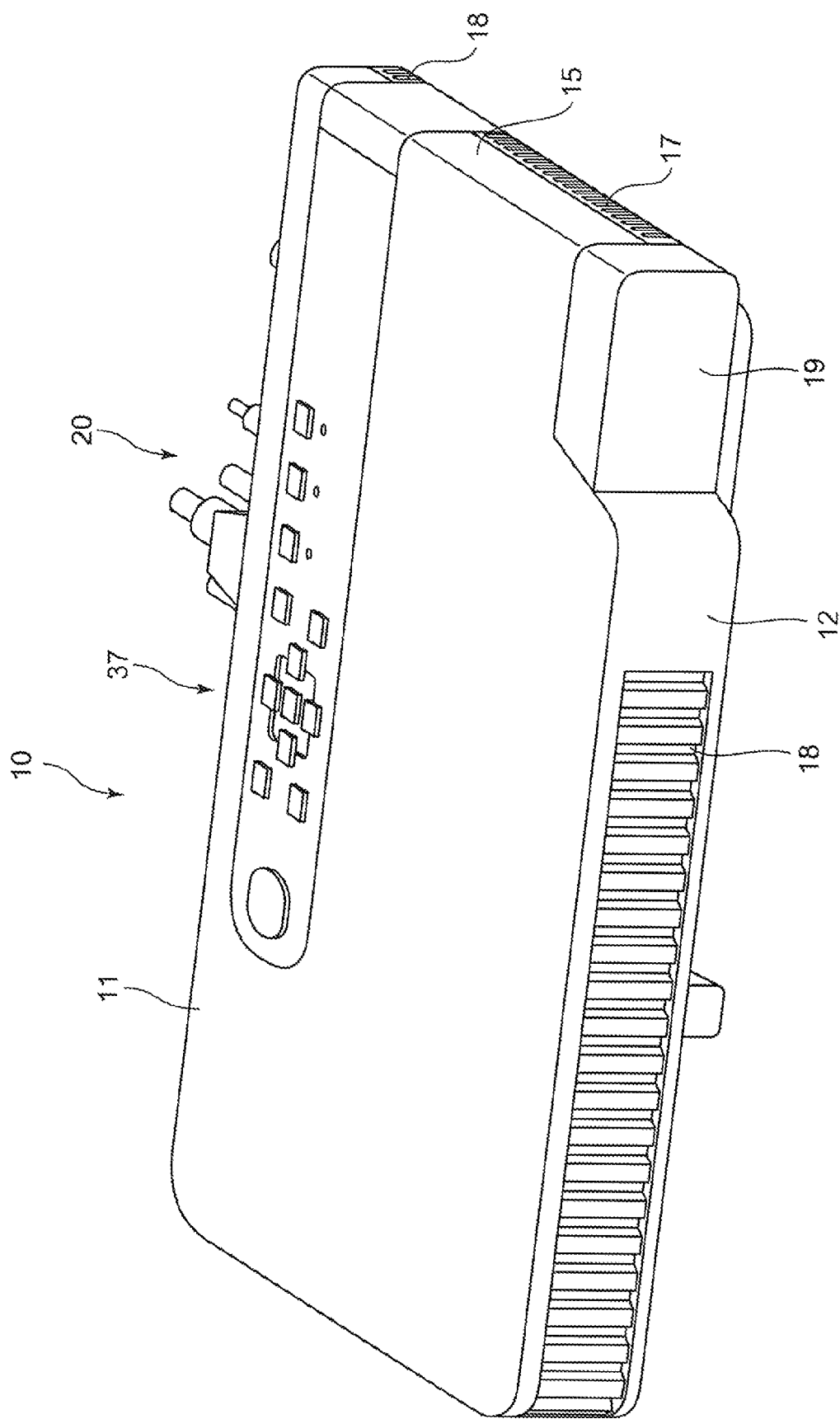
FIG. 1 is a perspective view showing an external appearance of a projector according to an embodiment of the invention.

Hereinafter, a first embodiment of the invention will be described. FIG. 1 is a perspective view showing an external appearance of a projector 10. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a lens cover 19 which covers a projection port which is laid to a side of a front panel 12 which is referred to as a front side panel of a projector casing, as well as a plurality of outside air inlet ports 18 which are formed in the front panel 12. Further, although not shown, the projector 10 includes an Ir reception unit which receives a control signal from a remote controller.

In addition, a keys/indicators unit 37 is provided on an upper side panel 11 which makes up of a part of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display device, a control circuit or the like overheats.

Further, provided on a back side or a back side panel of the projector casing are an input/output connector unit 21 where USB terminals, an image signal input D-SUB terminal, an S terminal, an RCA terminal, an audio output terminal and the like are provided and various types of terminals 20 including a power supply adaptor plug and the like. A plurality of outside air inlet ports are formed in the back side panel. Additionally, pluralities of inside air outlet ports 17 are formed in a right-hand side panel which is a lateral side panel, not shown, of the casing and a left-hand side panel 15 which is a lateral side panel shown in FIG. 1. In addition, outside air inlet ports 18 are also formed in a corner portion between the left-hand side panel 15 and the back side panel.

Figure 2:
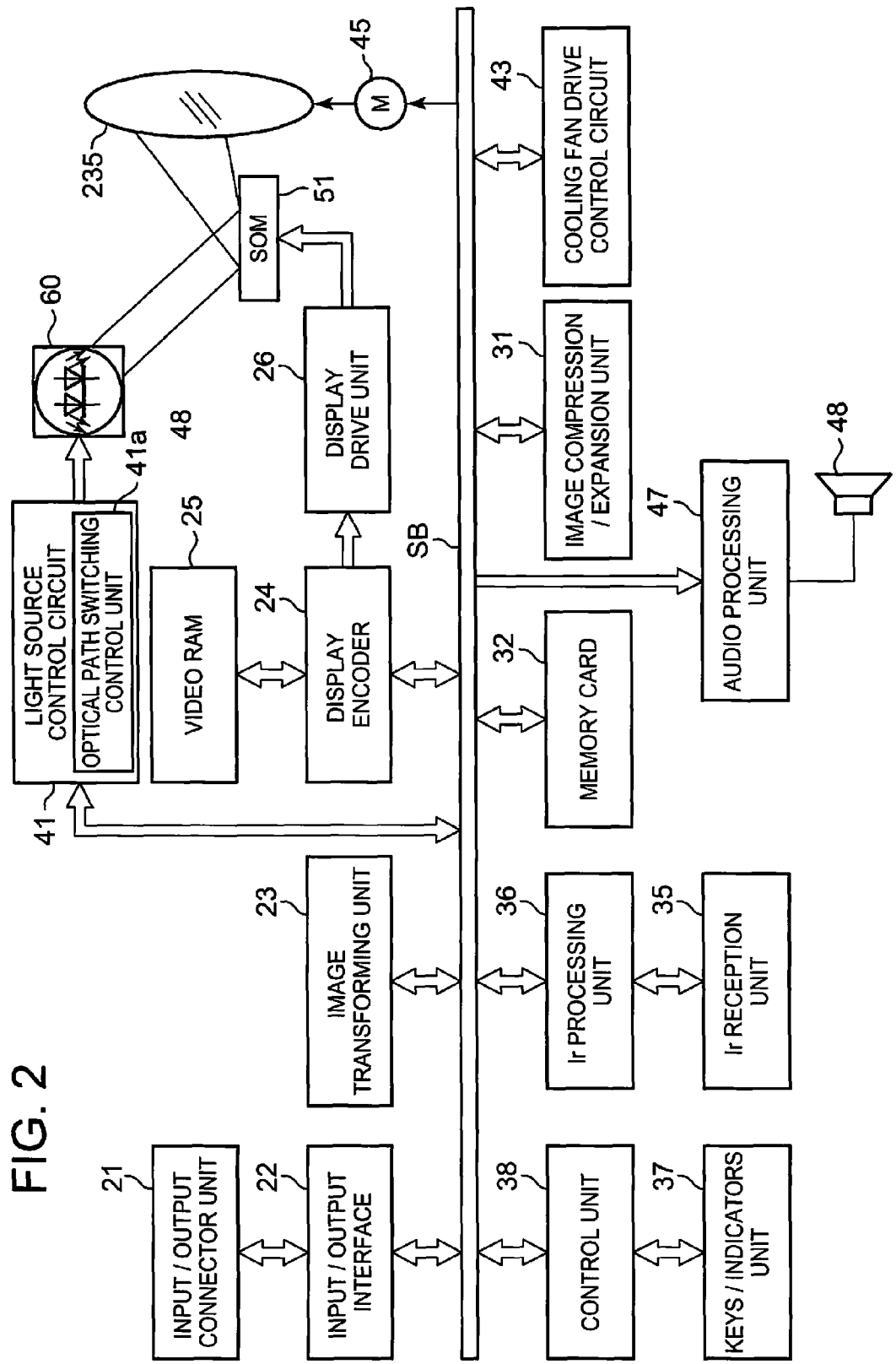
FIG. 2 is a functional block diagram of the projector according to the embodiment of the invention.

Next, a projector control unit of the projector 10 will be described by use of a functional block diagram in FIG. 2. The projector control unit includes a control unit 38, an input/output interface 22, an image transforming unit 23, a display encoder 24, a display drive unit 26 and the like. The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display device control unit and drives a display device 51 which is a spatial optical modulator (SOM) at an appropriate frame rate in response to the image signal outputted from the display encoder 24. In this projector 10, a pencil of light which is emitted from a light source unit 60 is shone onto the display device 51 to thereby form an optical image based on reflected light reflected by the display device 51. The image so formed is then projected on to a screen, not shown, for display via a projection side optical system.

A movable lens group 235 of the projection side optical system is driven by a lens motor 45 for zooming or focusing.

An image compression/expansion unit 31 performs a recording operation in which a luminance signal and a color difference signal of an image signal are data-compressed through ADCT, Huffman coding and the like and the compressed data is sequentially written on a memory card 32 which is configured as a detachable recording medium. When in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the projector casing are sent out directly to the control unit 38. Key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control unit 38 controls a light source control circuit 41 which is configured as a light source control unit. This light source control circuit 41 controls the light source unit 60 so that light of a predetermined wavelength band which is required when images are reproduced is emitted from the light source unit 60. This light source unit 60 includes an excitation light shining device including a blue laser oscillator, a red light source device, and a luminescent light emitting device having a luminescent wheel. In addition, the light source control circuit 41 includes an optical path switching control unit 41a which controls an optical path switching device 240. The light source control circuit 41 has a function to on/off control a switching diffraction grating, which will be described later or on/off control the energization of a polarization changing device, which will be described later and the like. These functions are controlled by the optical path switching control unit 41a.

In addition, the control unit 38 causes a cooling fan drive control circuit 43 to detect temperatures through a plurality of temperature sensors which are provided in the light source unit 60 so as to control the rotating speed of a cooling fan based on the results of the temperature detection. Further, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
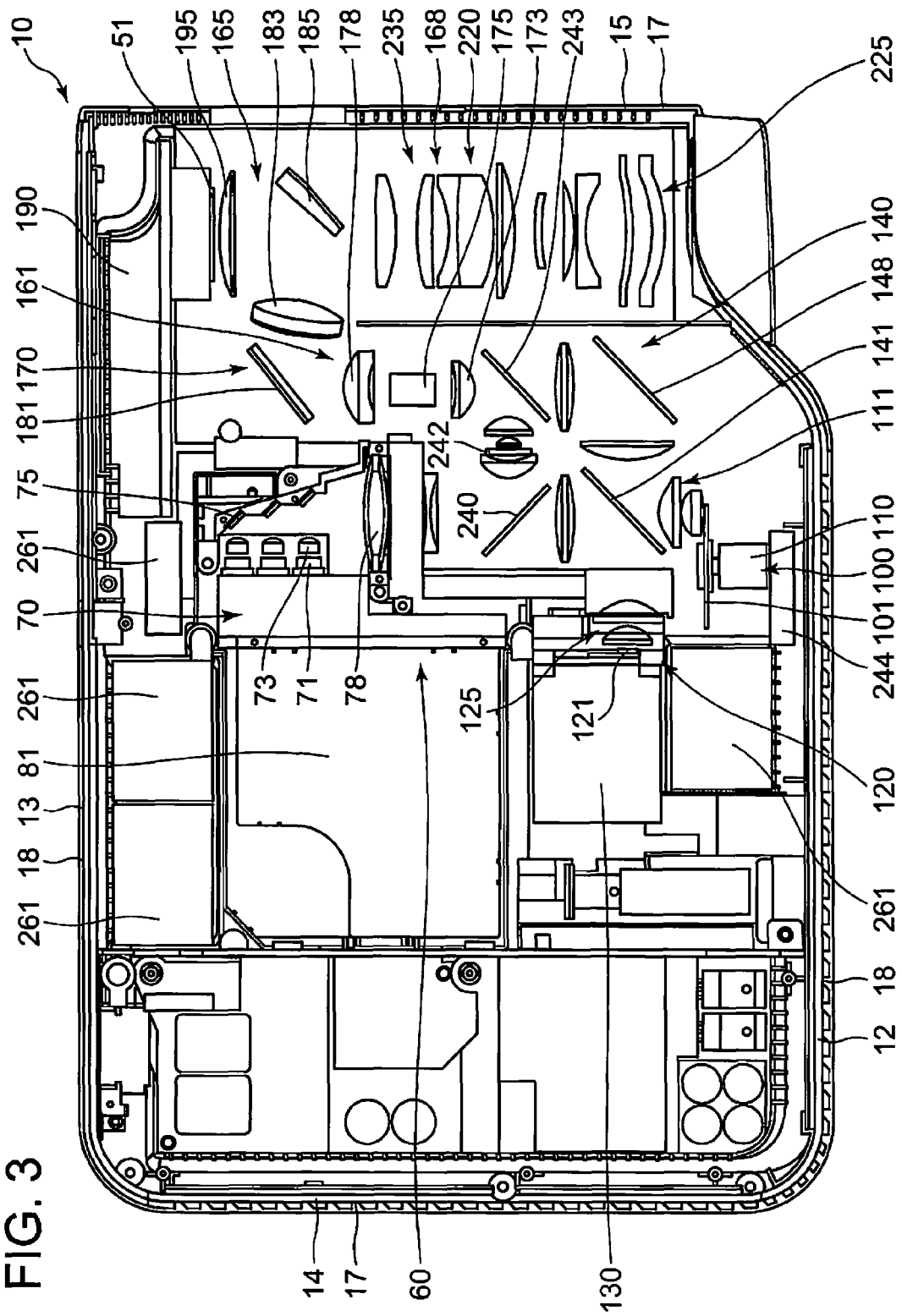
FIG. 3 is an exemplary plan view showing an internal construction of the projector according to the embodiment of the invention.

Next, an internal construction of the projector 10 will be described. FIG. 3 is an exemplary plan view showing an internal construction of the projector 10. As is shown in FIG. 3, the projector 10 includes a control circuit board, not shown, in proximity to the right-hand side panel 14. This control circuit board includes a power supply circuit block and a light source control block. In addition, the projector 10 includes the light source unit 60 which is provided to a side of the control circuit board, that is, at a substantially central portion of the projector casing. Further, the projector 10 includes three blocks such as an illumination side optical block 161, an image generating optical block 165 and a projection side optical block 168 which are disposed between the light source unit 60 and the left-hand side panel 15.

The light source unit 60 of the invention, which will be described, includes an excitation light shining device 70 as a first light source which is disposed in a position lying at a transversely and substantially central portion of the projector casing and in the proximity to the back side panel 13 and a luminescent light emitting device 100 which is disposed in a position lying on an optical axis of a pencil of light emitted from the excitation light shining device 70 and in the proximity to the front side panel 12, a red light source device 120 which is a second light source disposed to a side of a portion lying between the excitation light shining device 70 and the luminescent light emitting device 100, and a light guiding optical system 140.

In addition to the optical path switching device 240 disposed between the excitation light shining device 70 and the luminescent light emitting device 100, this light guiding optical system 140 includes dichroic mirrors 141, 243, a reflecting mirror 148, a diffuse plate 242 and collective lenses. This light guiding optical system 140 turns the directions of respective optical axes of light which is one of light beams which are directed into two directions as a result of light emitted from the excitation light shining device 70 being switched in a time-sharing fashion by the optical path switching device 240, light emitted from the luminescent light emitting device 100 as a result of the other light directed in the other direction being shone on thereto and light emitted from the red light source device 120 so that these beams of light are guided along the same optical axis to be incident on an incident opening in a light tunnel which is a predetermined plane thereof by use of the mirrors.

The excitation light shining device 70 includes excitation light sources 71 which are made up of semiconductor light emitting elements which are disposed so that their optical axes are parallel to the back side panel 13, a group of reflection mirrors 75 which changes the optical axis of light emitted from the excitation light sources 71 through 90 degrees towards the front side panel 12, a collective lens 78 which collects the light emitted from the excitation light sources 71 and reflected by the group of refection mirrors 75, and a heat sink 81 which is disposed between the excitation light sources 71 and the right-hand side panel 14.

The excitation light sources 71 are a total of six blue laser oscillators which are semiconductor light emitting elements arranged into a matrix of two rows and three columns. Collimator lenses 73 are disposed on optical axes of the blue laser oscillators. The collimator lenses 73 are collective lenses which convert light emitted from the blue laser oscillators into parallel light. In addition, the group of reflection mirrors 75 is made up of a plurality of reflection mirrors which are arranged in a step-like fashion. The reflection mirrors 75 reduce in one direction sectional areas of pencils of light which are emitted from the excitation light sources 71 for emission to the collective lens 78.

Excitation light emitted from the excitation light sources 71 is collected by the collective lens 78 to pass through the optical path switching device 240. The optical path switching device 240 is a time-sharing switching mirror which switches the optical path of any polarized excitation light so that the polarized excitation light is transmitted therethrough or reflected thereby by being electrically controlled in a time-sharing fashion.

The excitation light that has passed through the optical path switching device 240 passes further through a collective lens and the dichroic mirror 141 to be shone on to a luminescent wheel 101 which is a light emitting plate. The dichroic mirror 141 transmits blue and red light and reflects green light. When the excitation light is shone on to the luminescent wheel 101, light of green wavelength band is excited by a luminescent material on the luminescent wheel 101 and is emitted through luminescence in every direction. The luminescent light is then emitted directly to the dichroic mirror 141 or is reflected on a reflection plane on a surface of a base material of the luminescent wheel 101 to be emitted to the dichroic mirror 141. Then, the light of green wavelength band which is emitted from the luminescent wheel 101 is reflected by the dichroic mirror 141 to be shone on to a reflection mirror 148.

The light of green wavelength band is then reflected by the reflection mirror 148 and reaches a collective lens 173 by way of a collective lens, the reflection mirror 148 and the dichroic mirror 243 to be incident on the light tunnel 175. The dichroic mirror 243 transmits green and red light and reflects blue light.

When excitation light is reflected by the optical path switching device 240, the excitation light reflected passes through the collective lens and is diffused by the diffuse plate 242 to be blue diffuse light. The blue diffuse light then passes through the collective lenses to be shone on to the dichroic mirror 243. Then, the blue diffuse light is reflected by the dichroic mirror 243 and reaches the collective lens 173 to be incident on the light tunnel 175.

A cooling fan 261 is disposed between the heat sink 81 and the back side panel 13. The excitation light sources 71 are cooled by the cooling fan 261 and the heat sink 81. Further, a cooling fan 261 is also disposed between the group of reflection mirrors 75 and the back side panel 13, and the group of reflection mirrors 75 and the collective lens 78 are cooled by the cooling fan 261.

The luminescent light emitting device 100 includes the luminescent wheel 101, a wheel motor 110 which is a rotary device which rotationally drives the luminescent wheel 101 and a group of collective lenses 111 which collects luminescent light emitted from the luminescent wheel 101. The luminescent wheel 101 is disposed so as to be parallel to the front side panel 12, that is, so as to be at right angles to an optical axis of light emitted from the excitation light shining device 70. Further, a cooling fan 244, which is a cooling device, is disposed on a side of the wheel motor 110 which faces the front side panel 12, and the luminescent wheel 101 and the wheel motor 110 are cooled by this cooling fan 244.

In the luminescent wheel 101, a green luminescent material is disposed on a circular disk in a circumferential direction, and the rotation of the circular disk can be controlled. The wheel motor 110 is mounted at a central portion of the circular disk, and the luminescent wheel 101 is provided so as to be rotated by the wheel motor 101. In this configuration, the luminescent wheel 101 is rotated by the wheel motor 110 which is controlled so as to be driven at a rotating speed of about 120 revolutions per second by the control unit of the projector control unit. However, since the luminescent wheel 101 does not have to generate a plurality of colors, the control unit 38 does not have to control the wheel motor 110 so as to rotate at a constant speed.

The red light source device 120 includes a red light source 121 which is disposed so that an optical axis thereof is at right angles to an optical axis of excitation light which is incident on the luminescent wheel 101, and a group of collective lenses 125 which collects light emitted from the red light source 121. The red light source 121 is a red light emitting diode as a semiconductor emitting device which emits light of red wavelength band.

Light of red wavelength band which is shone by the red light source device 120 passes through the dichroic mirror 141 and, like light of green wavelength band which is emitted from the luminescent wheel 101, reaches the collective lens 173 by way of the collective lens, the reflection mirror 148 and the dichroic mirror 243 to be incident on the light tunnel 175.

Further, the red light source device 120 includes a heat sink 130 which is disposed on a side of the red light source 121 which faces the right-hand side panel 14. A cooling fan 261 is disposed between the heat sink 130 and the front side panel 12, and the red light source 121 is cooled by this cooling fan 261.

The three blocks such as the illumination side optical block 161, the image generating optical block 165 and the projection side optical block 168 which are disposed between the light source unit 60 and the left-hand side panel 15 are disposed in a substantially U-like shape.

The illumination side optical block 161 includes part of a light source side optical system 170 which guides light source light emitted from the light source unit 60 to the display device 51 that the image generating optical block 165 includes. Included as the light source side optical system 170 that the illumination side optical block 161 has are the light tunnel 175 which turns a pencil of light emitted from the light source unit 60 into one having a uniform intensity distribution, a collective lens 178 which collects light emitted from the light tunnel 175 and an optical axis turning mirror 181 which turns the optical axis of a pencil of light that has emerged from the light tunnel 175 in the direction of the image generating optical block 165.

The image generating optical block 165 has a collective lens which collects the light source light which is reflected on the optical axis turning mirror 181 to the display device 51 and a shining mirror 185 which shines the pencil of light that has passed through the collective lens 183 on to the display device 51 at a predetermined angle. The image generating optical block 165 constitutes the light source side optical system 170 together with the part of the light source side optical system 170 that the illumination side optical block 161 includes.

Further, the image generating optical block 165 includes a DMD which functions as the display device 51. A heat sink 190 for cooling the display device 51 is disposed between the display device 51 and the backside panel 13 to cool the display device 51. In addition, a condenser lens 195 is disposed in the proximity to a front side of the display device 51 as part of a projection side optical system 220.

The projection side optical block 168 has a group of lenses of the projection side optical system 220 which projects "on" light which is reflected on the display device 51 on to the screen. This projection side optical system 220 is made up of a variable focus lens with zoom function which includes a group of fixed lenses 225 which is incorporated in a fixed lens barrel and a group of movable lenses 235 which is incorporated in a movable lens barrel, and the group of movable lenses 235 are moved by a lens motor for zooming and focusing.

Figure 4:
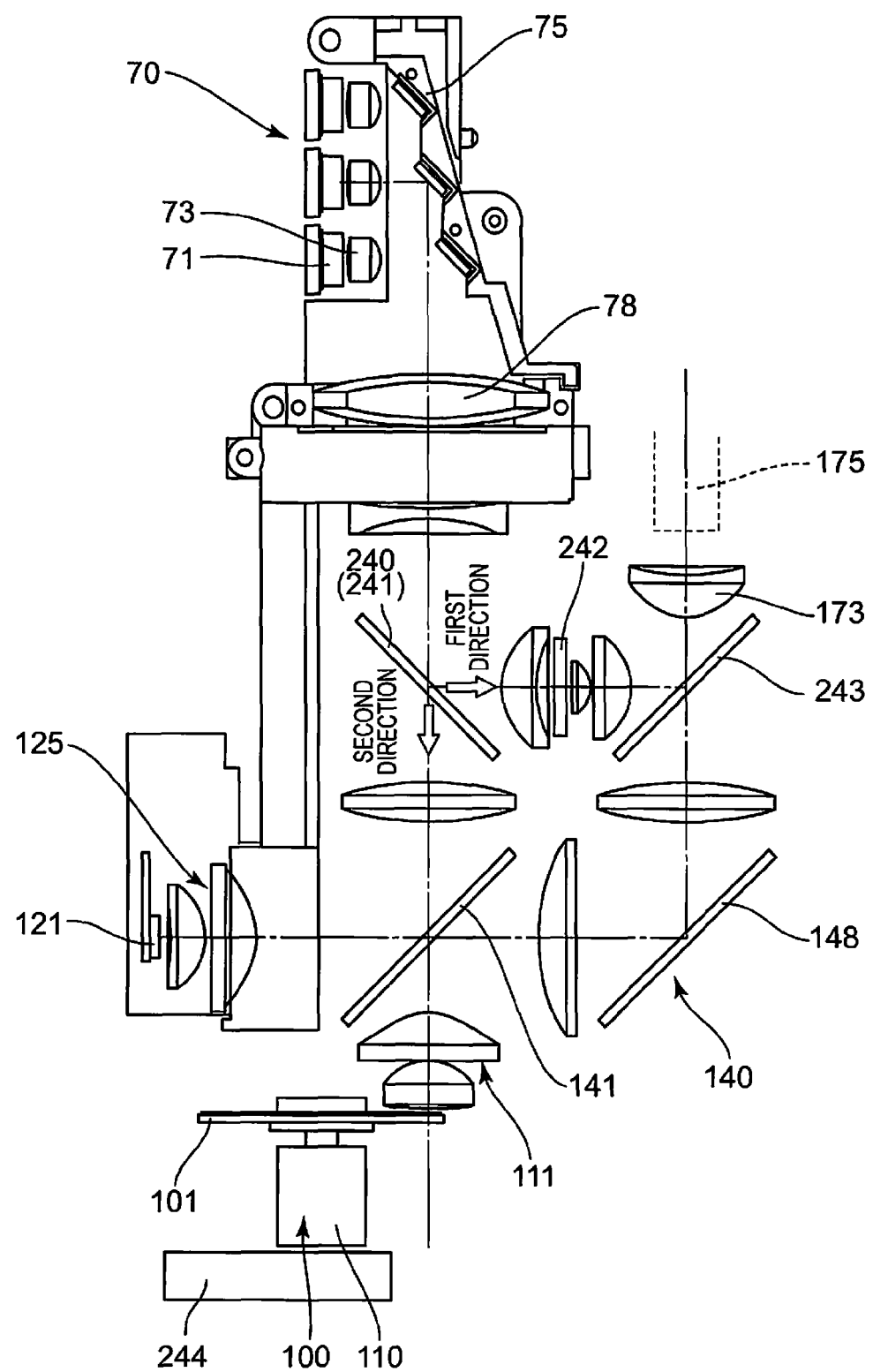
FIG. 4 is an exemplary plan view showing one configuration example of a light source unit for the projector according to the embodiment of the invention.
Figure 5:
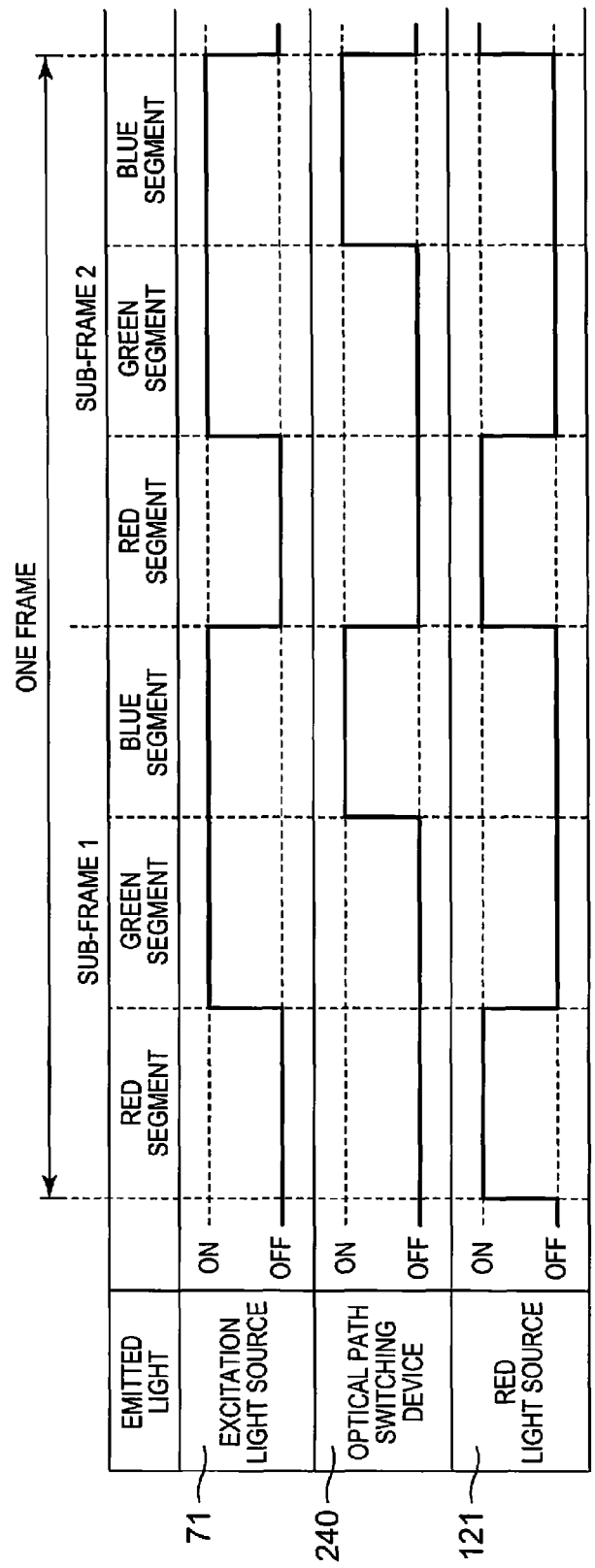
FIG. 5 is an explanatory chart in relation to a time-sharing control of an optical path switching device for the projector according to the embodiment of the invention.

Next, the light source unit 60 according to the invention will be described in detail by use of the drawings. FIG. 4 is an exemplary plan view of the light source unit 60 of the projector 10. FIG. 5 is an explanatory chart in relation to the time-sharing control of the light source devices and the optical path switching device 240 within one frame.

As FIG. 4 shows, the light source unit 60 includes the excitation light shining device 70 as the first light source which includes the plurality of excitation light sources 71 which are the blue laser emitting devices which shine light of blue wavelength band, the luminescent wheel 101 which is the light emitting plate on which the luminescent material layer which receives excitation light to emit light of green wavelength band is formed, and the optical path switching device 240 which switches light emitted from the excitation light shining device 70 in to the first direction and the second direction in the time sharing fashion, that is, switches the light emitted from the excitation light shining device 70 into the first light which is shone in the first direction and the second light which is shone in the second direction in a time sharing fashion.

Further, the light source unit 60 includes the red light emitting diode which is the red light source 121 as the second light source and the light guiding optical system 140 which causes luminescent light emitted from the luminescent wheel 101 by shining light switched into the first direction by the optical path switching device 240 and light switched into the second direction by the optical path switching device 240 on to the luminescent wheel 101 and light from the red light source 121 to converge to the same optical path.

The control unit 38 controls individually the excitation light shining device 70, the red light source 121 and the optical path switching device 240 of the light source unit 60 so that light of a predetermined wave length band which is required in generating an image is emitted from the light source unit 60 by controlling the light source control circuit 41 and the optical path switching control unit 41a.

Specifically speaking, as is shown in FIG. 5, one frame is made up of two sub-frames of a sub-frame 1 and a sub-frame 2. In each sub-frame, individual segments are formed sequentially by controlling the excitation light sources 71 of the excitation light shining device 70, the red light source 121 and the optical path switching device 240.

In addition, the optical path switching device 240 is the time-sharing switching mirror which switches the optical path of any polarized excitation light so that the polarized excitation light is transmitted therethrough or reflected thereby by being electrically controlled in a time-sharing fashion by the optical path switching control unit 41a. This time-sharing switching mirror can be made by use of a switching diffraction grating 241 such as DigiLens (the registered trade mark).

The switching diffraction grating 241 is controlled so as to be synchronized with the emission of light from the excitation light sources 71 of the excitation light shining device 70 by the optical path switching control unit 41a and turns a traveling direction of light by diffracting excitation light emitted from the excitation light shining device 70. For example, as FIG. 5 shows, when the optical path switching control unit 41a performs an "on" control in synchronism with the emission of light from the excitation light sources 71, the switching diffraction grating 241 turns the excitation light by 90 degrees towards the first direction so that the excitation light is guided in the direction of the diffuse plate 242.

The excitation light whose optical path has been turned by 90 degrees passes through the collective lens to be shone on to the diffuse plate 242. Then, the excitation light becomes blue diffuse light and further passes through collective lenses to be shone on to the dichroic mirror 243 which transmits green and red light and reflects blue light. The excitation light is then reflected by the dichroic mirror 243 and the optical path thereof is turned by 90 degrees. The excitation light then passes through the collective lens 173 to be incident on the light tunnel 175, thereby making it possible to form a blue segment through which light of blue wavelength band is emitted from the light source unit 60.

The diffuse plate 242 is, for example, a circular disk which is rotated by providing a rotating device such as a motor so that when excitation light is shone on thereto from the excitation light sources 71, the circular disk emits diffuse light as light that has passed therethrough or a substrate which is finely vibrated by a piezo actuator so that when excitation light is shone on thereto from the excitation light sources 71, the substrate emits diffuse light as light that has passed therethrough. By this action of the diffuse plate 242 laser light is properly turned into diffuse light, thereby making it possible to suppress noise such as speckles.

As FIG. 5 shows, when the optical path switching control unit 41a performs an "off" control in synchronism with the emission of light from the excitation light sources 71, the switching diffraction grating 241 transmits the excitation light and guides it to the luminescent wheel 101 which is situated in the second direction straight ahead thereof.

Being allowed to travel straight ahead by the switching diffraction grating 241, the excitation light passes through the collective lens and then further passes through the collective lens and the dichroic mirror 141 which transmits blue and red light and reflects green light and the group of collective lenses 111 to thereby be shone on to the luminescent wheel 101. Part of light of green wavelength band which is excited by the luminescent material is partially emitted towards the dichroic mirror 141, while the other part of the excitation light is reflected by the luminescent wheel 101 and then passes through the group of collective lenses 111 to thereby be shone on to the dichroic mirror 141.

Then, the light of green wavelength band is reflected by the dichroic mirror 141 and passes through the collective lens. Then, the excitation light is reflected by the reflection mirror 148, passes through the collective lens and the dichroic mirror 243 and is incident on the light tunnel via the collective lens 173, thereby making it possible to form a green segment through which light of green wavelength band is emitted from the light source unit 60.

The red light source 121, which is the second light source, is made up of the red light emitting diode as has been described above. Light emitted from the red light source 121 as a result of emission of light from the red light emitting diode passes through the group of collective lenses 125 and further passes through the dichroic mirror 141 and the collective lens to be reflected by the reflection mirror 148. Then, the red light so reflected passes through the collective lens and further passes through the dichroic mirror 243 and the collective lens 173. Thus, the light of red wavelength band is emitted from the light source unit 60 and is incident on the light tunnel 175, whereby a red segment is formed through which light of red wavelength band is emitted from the light source unit 60.

After passing through the dichroic mirror 141, the light of red wavelength band from the red light source 121 is caused to travel along the same optical path as that of luminescent light from the luminescent wheel 101, is reflected by the reflection mirror 148 and passes through the dichroic mirror 243. Thereafter, the red light travels along the same optical path as that of the light which is separated into the first direction at the switching diffraction grating 241.

Second Embodiment

Figure 6:
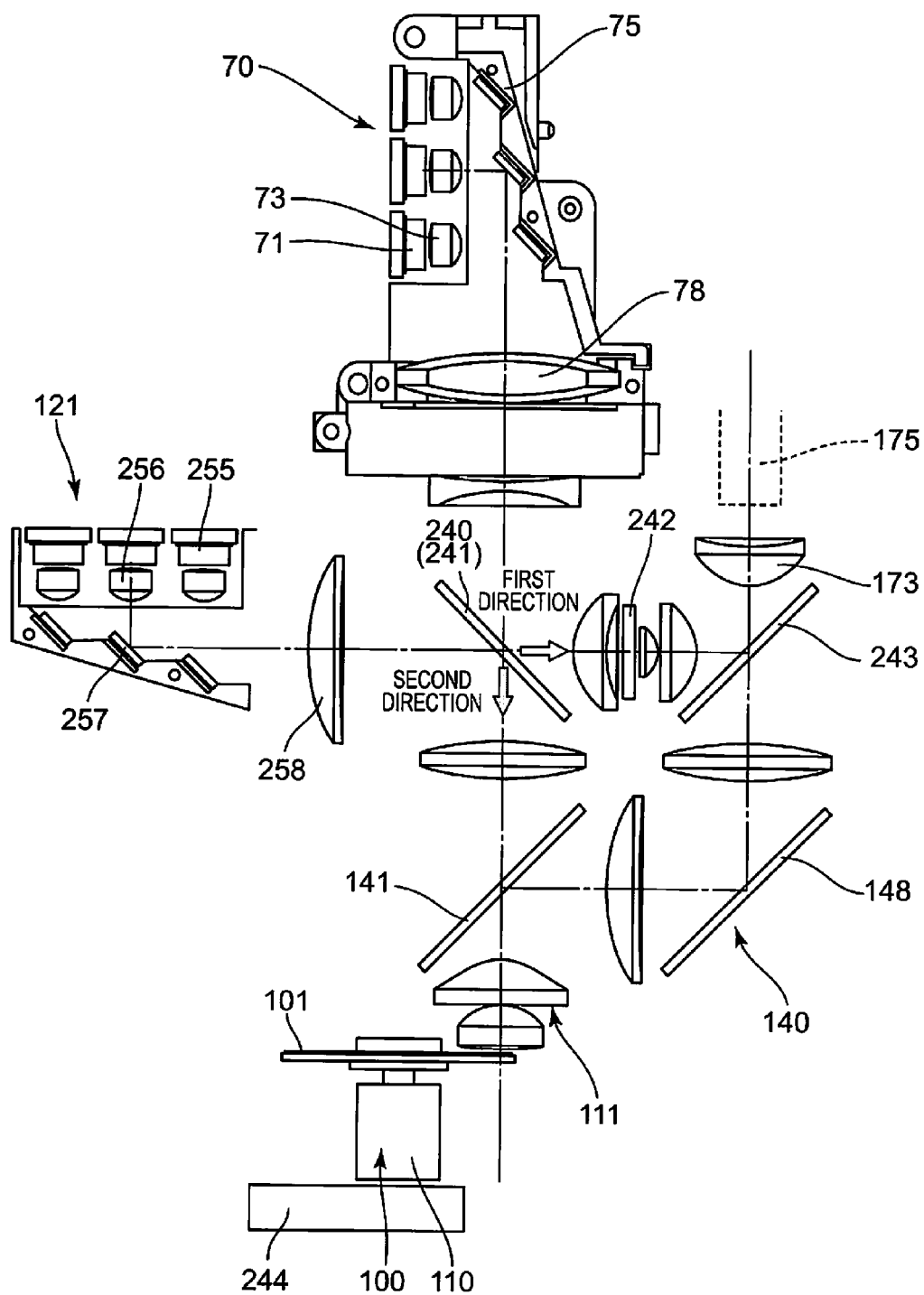
FIG. 6 is an exemplary plan view showing another configuration example of a light source unit for the projector according to the embodiment of the invention.

The invention is not limited to the use of a red light emitting diode for a red light source 121 which is a second light source. As FIG. 6 shows, red laser emitting devices 255 can also be used as a red light source.

In the case of red laser emitting devices 255 being used as a red light source 121, like the blue laser light emitting devices of the excitation light shining device 70, the red laser emitting devices 255 are a total of six semiconductor light emitting elements which are arranged into a matrix of two rows and three columns. Collimator lenses 256 are disposed individually on optical axes of the red laser emitting devices 255 as is shown in the FIG. 6. The collimator lenses 256 are collective lenses which convert light emitted from the red laser emitting devices 255 into parallel light. In addition, a group of reflection mirrors 257 is made up of a plurality of reflection mirrors which are arranged in a step-like fashion. The reflection mirrors 257 reduce in one direction sectional areas of pencils of light which are emitted from the red laser emitting devices 255 for emission to a collective lens 258.

In addition, light emitted from the collective lens 258 of the red light source 121 is shone on to the optical path switching device 240 with its optical axis intersecting the optical axis of excitation light emitted from the excitation light shining device 70 at right angles. The optical path of the red light which has passed through the optical path switching device 240 becomes the same as the optical path of the excitation light emitted from the excitation light shining device 70 and switched into the first direction by the optical path switching device 240.

Then, in guiding the light of red wavelength band emitted from the red laser emitting devices 255 to the light tunnel 175, by "off" controlling the light of red wavelength band so emitted at the switching diffraction grating 241 by the optical path switching control unit 41a as control of the switching diffraction grating 241, the light of red wavelength band which has passed through the switching diffraction grating 241 travels straight ahead towards the diffuse plate 242.

The light of red wavelength band which has traveled straight through the switching diffraction grating 241 passes through the collective lenses to be shone on to the diffuse plate 242 to become red diffuse light. The red diffuse light then passes through the collective lenses and is then reflected by the dichroic mirror 243 which transmits green light and reflects blue and red light so that its optical path is turned by 90 degrees and is eventually incident on the light tunnel 175 by way of the collective lens.

Third Embodiment

Next, a third example of a light source unit 60 according to the invention will be described in detail by use of the drawings. This light source unit 60 uses, as an optical path switching device 240, a polarization changing device 250 and a polarization beam splitter 251.

Figure 7:
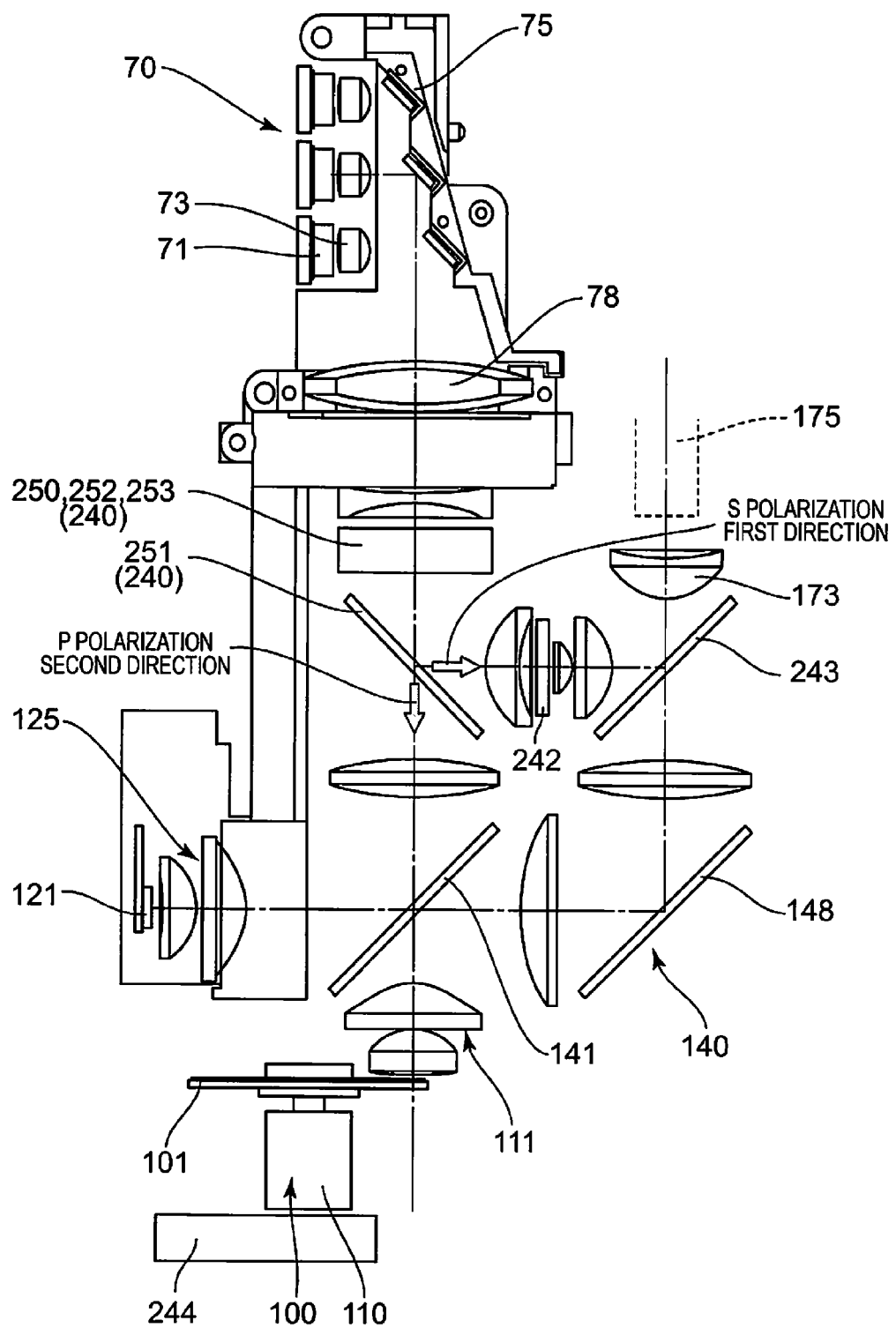
FIG. 7 is an exemplary plan view showing a further configuration example of a light source for the projector according to the embodiment of the invention.
Figure 8:
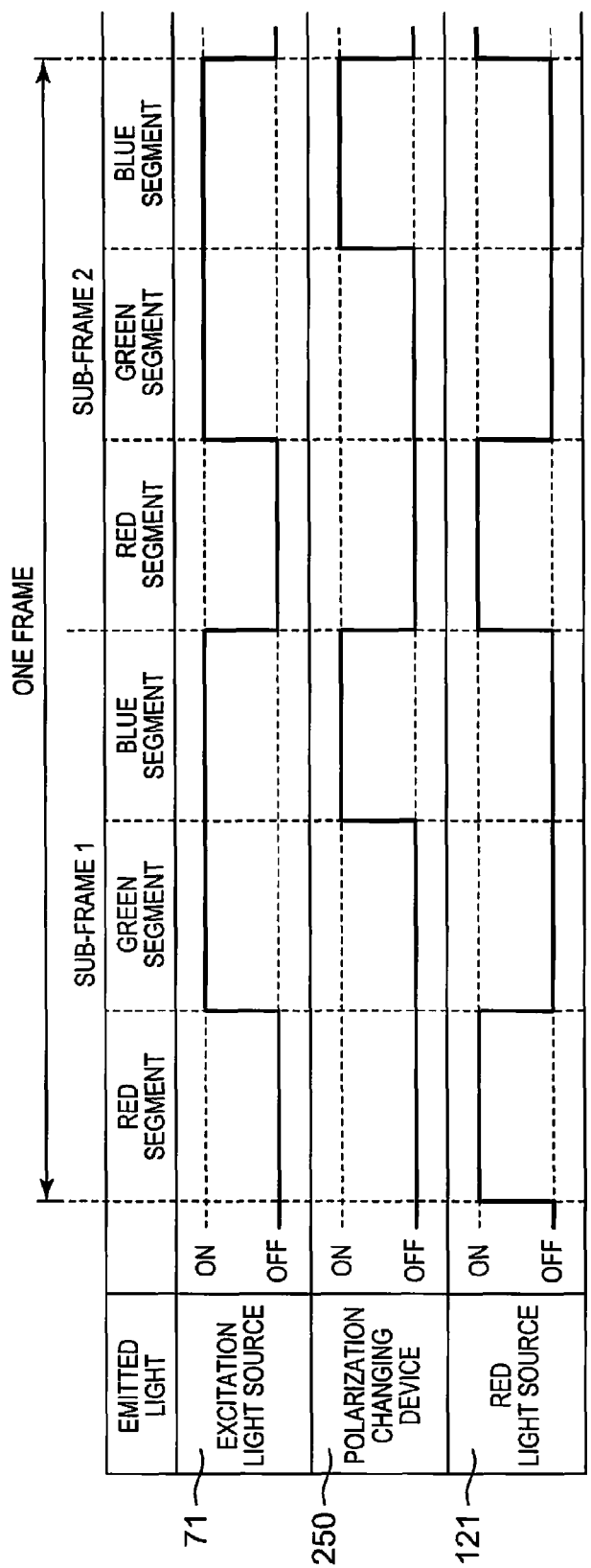
FIG. 8 is an explanatory chart in relation to a time-sharing control of a polarization changing device for the projector according the embodiment of the invention.

FIG. 7 is an exemplary plan view of the light source unit 60 which uses the polarization changing device 250 and the polarization beam splitter 251 as the optical path switching device 240. FIG. 8 is an explanatory chart depicting a time-sharing control of light sources and the polarization changing device 250 within one frame.

The optical path switching device 240 includes the polarization changing device 250 which changes a polarization direction in a time-sharing fashion by an optical path switching control unit 41a and the polarization beam splitter 251 which directs light which has passed through the polarization changing device 250 into two directions according to the polarization direction thereof.

Here, the polarization changing device 250 is a magnetic optical element 252. This magnetic optical element 252 is, for example, an optical member which is produced by winding a coil around a glass rod and which generates a magnetic field by being energized so as to change a plane of polarization to a predetermined orientation.

The magnetic optical element 252 controls a polarized state of excitation light which is incident thereon. Specifically speaking, the magnetic optical element 252 generates a magnetic field based on the Biot-Savart's law by energizing the coil.

This magnetic field is generated in a longitudinal direction of the glass rod. When excitation light in which the polarization direction thereof is aligned in a predetermined direction is caused to be incident on the glass rod which is being energized, the plane of polarization of the excitation light is turned in a predetermined direction. Namely, the plane of polarization of light is turned by means of the Faraday Effect. Since the plane of polarization of light changes in accordance with the strength of a magnetic field, the polarized state of the excitation light can be changed in accordance with the number of turns of the coil and current caused to flow therethrough, so that the excitation light is turned into P-polarized light and S-polarized light.

For example, the magnetic optical element 252 switches states of the excitation light of which the polarization direction is aligned in a direction in which the excitation light becomes P-polarized light through on/off control of energization of the coil by the optical path switching control unit 41a between a polarized state in which the polarization direction of the excitation light is turned by 90 degrees so that the excitation light becomes S-polarized light by causing a current to flow through the coil of the magnetic optical element 252 (energization-on) and a polarized state in which no current is caused to flow through the coil (energization-off) so that the excitation light is allowed to remain as the P-polarized light.

Then, the polarized states are changed in a time-sharing fashion, and the excitation light that has passed through the polarization changing device 250 is allowed to be incident on the polarization beam splitter 251 which directs excitation light into two directions according to the polarization direction thereof.

The polarization beam splitter 251 is an optical element which separates polarized light in a specific vibration direction. The polarization beam splitter 251 has a construction in which a polarized light separation film is disposed obliquely relative to an incident light ray.

Consequently, excitation light which is S-polarized light is reflected in the first direction by the polarization beam splitter 251, while excitation light which is P-polarized light is allowed to pass through the polarization beam splitter 251.

Here, optical paths of light will be described when it is converted into P-polarized light and S-polarized light. In excitation light emitted from excitation light sources 71, a polarization direction thereof is aligned, for example, to the P polarization direction, and when it is collected by a collective lens 78, the excitation light passes through the magnetic optical element 252 which is the polarization changing device 250.

As this occurs, by on/off controlling the energization of the magnetic optical element 252 in a time-sharing fashion by the optical path switching control unit 41a, the polarization direction of the excitation light of which the polarization direction is aligned to the P polarization direction is turned by 90 degrees so that the excitation light can be converted into S-polarized light or is allowed to remain as the P-polarized light.

Then, the light which has passed through the magnetic optical element 252 while remaining as the P-polarized light or which is converted into the S-polarized light is incident on the polarization beam splitter 251 which is the optical path switching device 240 which directs the excitation light into two directions in accordance with the polarization direction thereof, whereby the optical path of the excitation light is switched to a first direction and a second direction.

Consequently, as FIG. 8 shows, by on controlling or energizing the polarization changing device 250 which is the magnetic optical element 252 by the optical path switching control unit 41a when the excitation light shining device 70 is turned on which is made up of the excitation light sources 71 which emit excitation light of which the polarization direction is aligned to the P polarization direction, the polarization direction of the excitation light of which the polarization direction is aligned to the P polarization direction can be turned by 90 degrees so as to be converted into S-polarized light. Then, the excitation light which has passed through the polarization changing device 250 so as to be converted into the S-polarized light can be turned by 90 degrees to the first direction so that the traveling direction thereof can be guided in the direction of a diffuse plate 242.

The excitation light of which the optical path is turned by 90 degrees by the polarization beam splitter 251 passes through collective lenses to be shone on to the diffuse plate 242, whereby the excitation light is converted into blue diffuse light. The blue diffuse light then passes through collective lenses and is reflected by a dichroic mirror 243 so that an optical path of the blue diffuse light is turned by 90 degrees so as to be incident on a light tunnel 175 after passing through a collective lens, thereby making it possible to form a blue segment through which light of blue wavelength band is emitted from the light source unit 60.

On the contrary, by off controlling or deenergizing the polarization changing device 250 which is the magnetic optical element 252 by the optical path switching control unit 41a when the excitation light shining device 70 is turned on which is made up of the excitation light sources 71 which emit excitation light of which the polarization direction is aligned to the P polarization direction, the polarization direction of the excitation light of which the polarization direction is aligned to the P polarization direction is not turned, so that the excitation light is allowed to remain as the P-polarized light. Then, the traveling direction of the excitation light which has passed through the polarization changing device 250 as the P-polarized light can be guided by the polarization beam splitter 251 in the direction of a luminescent wheel 101 which is the second direction extending straight ahead of the polarization beam splitter 251.

The excitation light which is caused to travel straight ahead by the polarization beam splitter 251 passes through a collective lens and further passes through a dichroic mirror 141 and a group of collective lenses 111 so as to be shone on to the luminescent wheel 101. Part of light of green wavelength band which is excited by a luminescent material is emitted towards the dichroic mirror 141, while the other part thereof is reflected by the luminescent wheel 101 and passes through the group of collective lenses 111 so as to be shone on to the dichroic mirror 141. The light of green wavelength band is reflected by the dichroic mirror 141, passes through a collective lens and is reflected by a reflection mirror 148. Then, the light of green wavelength band passes through a collective lens and a dichroic mirror 243 and is then emitted from the light source unit 60 to be incident on the light tunnel 175 by way of the collective lens 173, thereby making it possible to form a green segment through which the light of green wavelength band is emitted from the light source unit 60.

Modified Example of Third Embodiment

Any other member than the magnetic optical element 252 can be used as the polarization changing device 250. For example, a switching polarization rotary element 253 can be used as a polarization changing device 250. This switching polarization rotary element 253 is made up of a liquid crystal switching element and changes the plane of polarization of light when energized.

The switching polarization rotary element 253 is a liquid crystal switching element which selectively rotates the plane of polarization of incident light for emission. This switching polarization rotary element 253 is an element which switches states of excitation light between two states which are indicated black and white, respectively, when representing them on a liquid crystal display.

In general, the switching polarization rotary element 253 performs two functions to rotate and not to rotate the plane of polarization of P-polarized light which passes therethrough. Namely, the switching polarization rotary element 253 operates to switch the states of P-polarized light between those two states.

Further, any other members than the magnetic optical element 252 operating based on the Faraday Effect and the switching polarization rotary element 253 which is made up of the liquid crystal element can be used as the polarization changing device 250. For example, a magnetic optical element which operates based on the magnetic Kerr effect and an optical element made of crystal and adapted to rotate the polarization direction by making use of its directivity can also be used as the polarization changing device 250.

Fourth Embodiment

Figure 9:
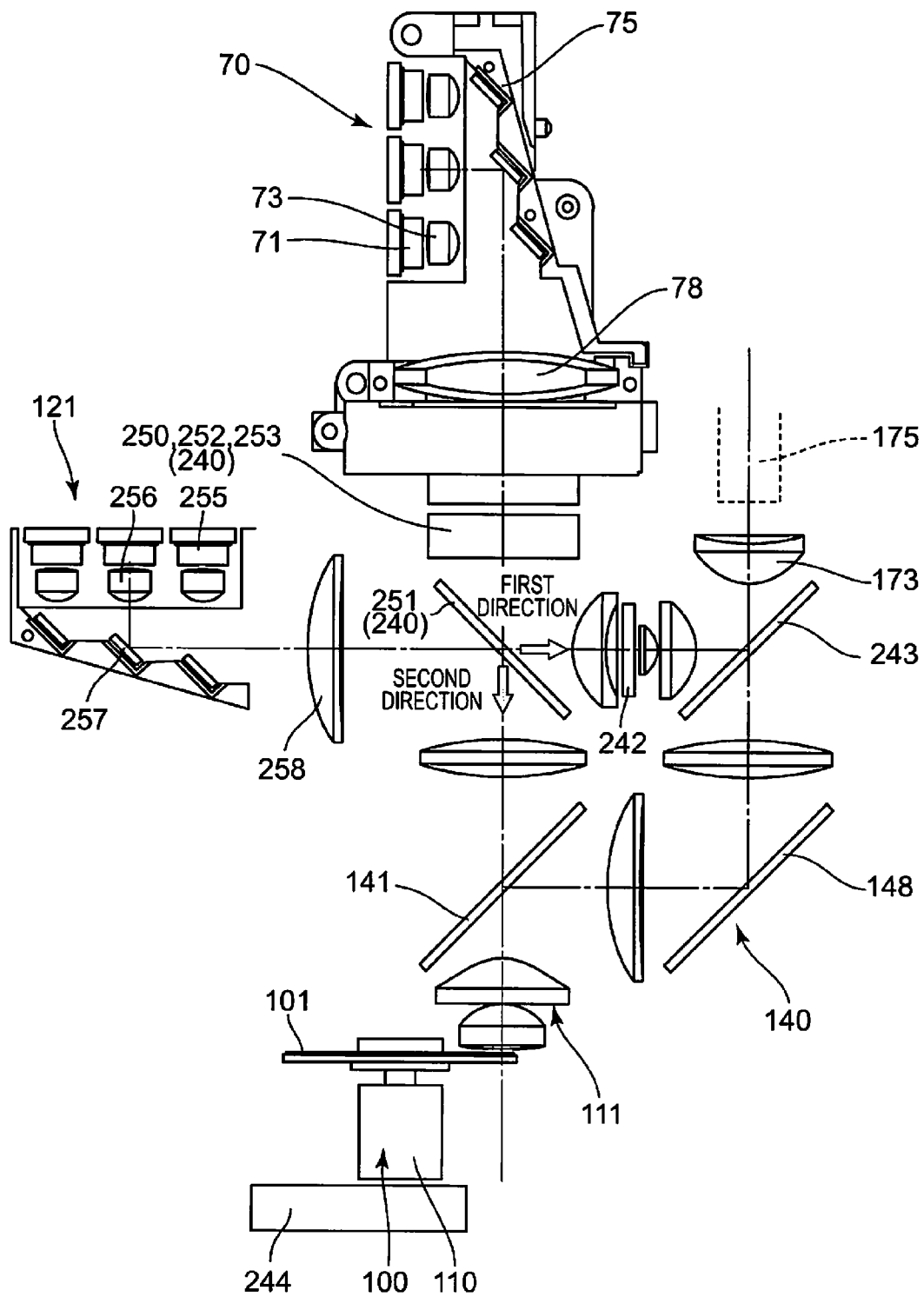
FIG. 9 is an exemplary plan view showing a configuration example of a light source for the projector according to the embodiment of the invention.

Even with a light source unit 60 which adopts the polarization changing device 250, a red light source 121 as a second light source is not limited to a red light emitting diode, and hence, as FIG. 9 shows, red laser emitting devices 255 can also be used as a red light source.

In this way, when red laser emitting devices 255 are used as a red light source, like the blue laser emitting devices of the excitation light shining device 70, six semiconductor emitting elements in total are arranged into a matrix of two rows of three columns as shown in FIG. 9. Collimator lenses 256 are disposed individually on respective optical axes of the red laser emitting devices 255 as shown in FIG. 9. The collimator lenses 256 are collective lenses which convert light emitted from the red laser emitting devices 255 into parallel light. A group of reflection mirrors 257 is made up of a plurality of reflection mirrors which are arranged in a step-like fashion. The reflection mirrors 257 reduce sectional areas of pencils of light which are emitted from the corresponding red laser emitting device 255 in one direction for emission to a collective lens 258.

In light emitted from the red laser emitting devices 255, the polarization direction is aligned to the P polarization direction. In guiding the light emitted from the red laser emitting devices 255 to a light tunnel 175, the light is guided so as to pass through a polarization beam splitter 251 to reach a diffuse plate 242.

The light of red wavelength band which passes straight through the polarization beam splitter 251 passes through collective lenses to be shone on to the diffuse plate 242. The light of red wavelength band is diffused so as to become red diffuse light and further passes through collective lenses to be shone on to a dichroic mirror 243 which transmits green light and reflects blue and red light. The red diffuse light is then reflected by the dichroic mirror 243, whereby an optical path of the red diffuse light is turned by 90 degrees, and the red diffuse light then passes through a collective lens to be shone on to a light tunnel 175, thereby making it possible to form a red segment through which the light of red wavelength band is emitted from the light source unit 60.

Fifth Embodiment

In the embodiments that have been described above, the optical path switching device 240 controls the transmission and reflection of light. However, in this embodiment, a light source unit 60 will be described which uses a time-sharing switching mirror which controls the switching of reflecting directions of light.

Figure 10:
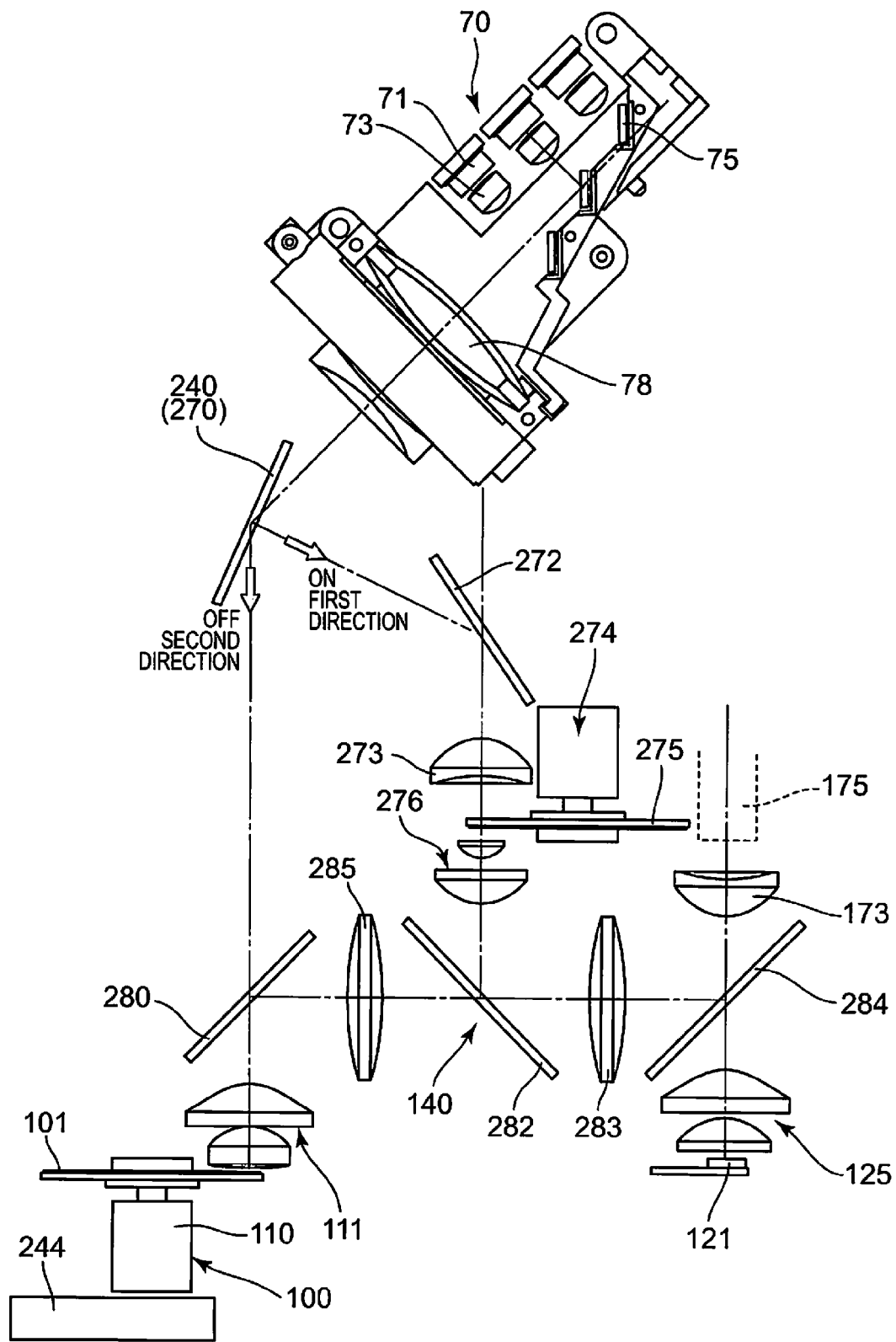
FIG. 10 is an exemplary plan view showing another configuration example of a light source for the projector according to the embodiment of the invention.
Figure 11:
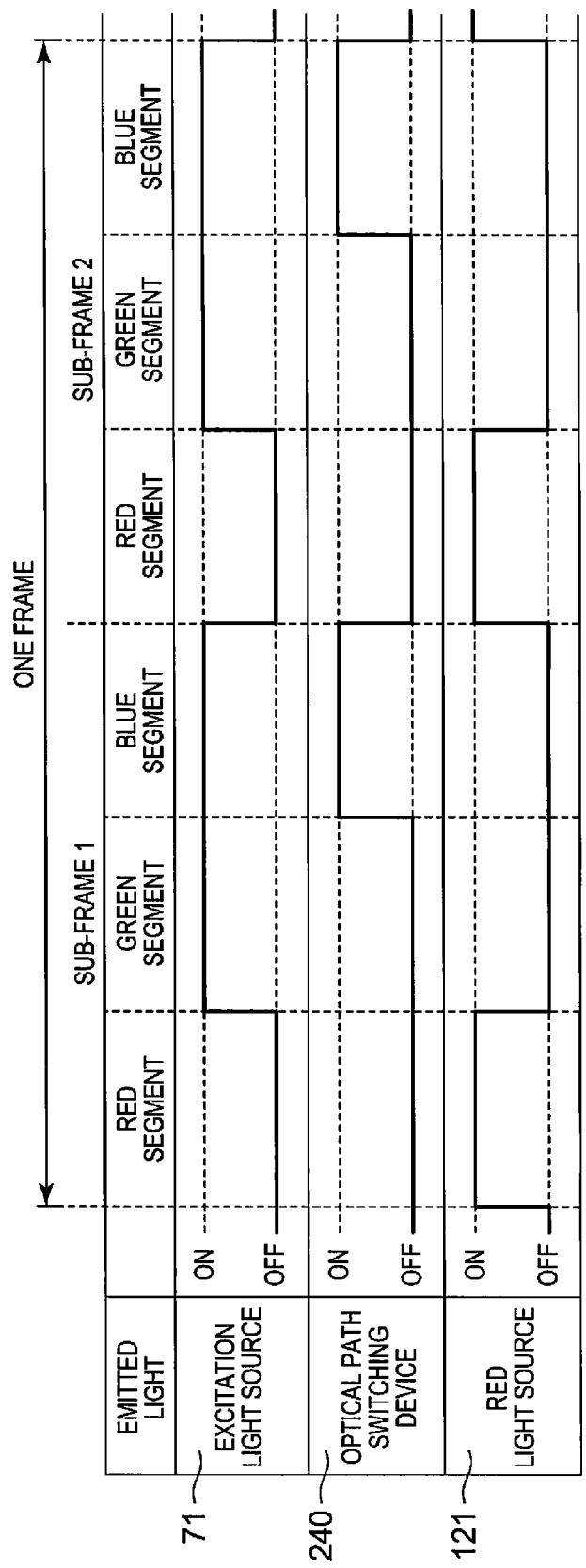
FIG. 11 is an explanatory chart in relation to a time-sharing control of an optical path switching device for the projector according to the embodiment of the invention.

The light source unit 60 includes, as an optical path switching device 240, a reflection angle changing mirror 270 such as an MEMS scanner. FIG. 10 is an exemplary plan view of the light source unit 60 which uses as the time-sharing switching mirror the reflection angle changing mirror 270 which is the optical path switching device 240, and FIG. 11 is an explanatory chart depicting a time-sharing control of light sources and the optical path switching device 240 within one frame 1.

The reflection angle changing mirror 270 which is the MEMS scanner is a mirror device which changes the inclination of the mirror at high speeds through electric control. Namely, the control unit 38 on/off controls the energization of an optical path switching unit 41a in a time-sharing fashion through electric control to change the inclination of a mirror of the MEMS scanner so as to switch reflection directions of light incident thereon.

As FIG. 10 shows, this light source unit 60 includes an excitation light shining device 70 as a first light source, a luminescent plate such as a luminescent wheel 101 or a luminescent material plate and a reflection angle changing mirror 270. The excitation light shining device 70 includes six excitation light sources 71 in total which are blue laser emitting devices for shining light of blue wavelength band, and the six excitation light sources 71 are arranged into a matrix of two rows and three columns. The luminescent wheel 101 or the luminescent material plate is a light emission plate on which a luminescent material layer is formed which receives excitation light to emit light of green wavelength band. The reflection angle changing mirror 270 is an optical path switching device 240 which switches light emitted from the excitation light shining device 70 in a time-sharing fashion into two directions of a first direction and a second direction.

Further, the light source unit 60 includes a red light source 121 as a second light source and a light guiding optical system 140. The red light source 121 is made up of a red light emitting diode. The light guiding optical system 140 collects luminescent light which is emitted from the luminescent plate such as the luminescent wheel 101 by shining light which is switched into the first direction by the reflection angle changing mirror and light which is switched into the second direction by the reflection angle changing mirror on to the luminescent plate and light from the red light source 121 on to the same optical path so as to be incident on a light tunnel 175.

Then, a control unit 38 controls a light source control circuit 41 and an optical path switching control unit 41a so as to control individually the excitation light shining device 70, the red light source 121 and the reflection angle changing mirror 270 which is the optical path switching device 240 of the light source unit 60 so that light of a predetermined wavelength band which is required when generating an image is emitted from the light source unit 60.

Specifically speaking, as FIG. 11 shows, one frame is made up of two sub-frames of a sub-frame 1 and a sub-frame 2. Then, in each sub-frame, the excitation light sources 71 of the excitation light shining device 70, the red light source 121 and the optical path switching device 240 are controlled so as to form segments sequentially. In addition, by forming such segments in a combined fashion, complementary colors of yellow and magenta can be formed.

As to an optical path of light which travels in the light source unit after having been reflected by the optical path switching device 240 or the reflection angle changing mirror 270, as FIG. 10 shows, when the optical path switching control unit 41a is on controlled in synchronism with the emission of light from the excitation light sources 71, the reflection angle changing mirror 270 changes its reflection angle to guide excitation light from the excitation light sources 71 to a mirror 272 which is disposed in the first direction.

The excitation light guided in the direction of the mirror 272 is reflected by the mirror 272, passes through a collective lens 273 and is shone on to a diffuse plate 275 of a diffuse device 274, where the excitation light is converted into blue diffuse light. Then, the blue diffuse light passes through the diffuse plate 275, passes then through a group of collective lenses 276 and is reflected by a dichroic mirror 282 which transmits green light and reflects blue light, whereby the optical path thereof is turned by 90 degrees. Further, the light which is now the blue diffuse light passes through a collective lens 283 and is then reflected by a dichroic mirror 284 which transmits red light and reflects green and blue light, whereby the optical path thereof is turned by 90 degrees. The light then passes through a collective lens 173 so as to be incident on the light tunnel 175, thereby making it possible to form a blue segment through which light of blue wavelength band is emitted form the light source unit 60.

The diffuse plate 275 of the diffuse device 274 is such as to shine diffuse light by rotating a circular disk by a rotating device such as a motor or such as to shine diffuse light by finely vibrating a substrate by a piezo actuator. By adopting this configuration, laser light is converted into diffuse light properly, thereby making it possible to suppress noise such as speckles.

As to an alternative optical path of light which travels in the light source unit after having been reflected by the optical path switching device 240 or the reflection angle changing mirror 270, as FIG. 10 shows, when the optical path switching control unit 41a is off controlled in synchronism with the emission of light from the excitation light sources 71, the reflection angle changing mirror 270 changes its reflection angle to guide excitation light from the excitation light sources 71 to a dichroic mirror 280 which is situated in the second direction.

Then, the blue excitation light is guided in the direction of the dichroic mirror 280 which reflects green light and transmits blue light by the reflection angle changing mirror 270, then passes through the dichroic mirror 280 and is eventually shone on to the luminescent wheel 101. Light of green wavelength band is excited by the luminescent material on the luminescent wheel 101. Part of the light of green wavelength band so excited is emitted towards the dichroic mirror 280, and the other part thereof is reflected by the luminescent wheel 101, is then emitted towards the dichroic mirror 280, passes through the group of collective lenses 111, and is eventually shone on to the dichroic mirror 280.

Then, the light of green wavelength band is reflected on the dichroic mirror 280, passes through the collective lens 285, the dichroic mirror 282 and the collective lens 283 and is reflected by the dichroic mirror 284 which transmits red light and reflects green and blue light, whereby the optical path thereof is turned by 90 degrees. Then, the light of green wavelength band then passes through the collective lens 173 and is incident on the light tunnel 175, thereby making it possible to form a green segment through which light of green wavelength band is emitted from the light source 60.

As has been described above, the red light source 121 which is the second light source is made up of the red light emitting diode. Light emitted from the red light source 121 as a result of the red light emitting diode emitting red light passes through a group of collective lenses 125 and further passes through the dichroic mirror 284 and the collective lens. In this way, light of red wavelength band is emitted from the light source unit 60, and the red light passes through the collective lens 173 so as to be incident on the light tunnel 175, thereby making it possible to form a red segment through which light of red wavelength band is emitted from the light source unit 60.

The light of red wavelength band which is emitted by the red light source 121 passes through the dichroic mirror 284, whereby the light of red wavelength band is allowed to travel along the same optical path as those of the light which passes through the diffuse plate 275 of the diffuse device 274 and the luminescent light from the luminescent wheel 101 both of which are reflected by the dichroic mirror 284.

Sixth Embodiment

In a light source unit 60 which adopts a reflection angle changing mirror 270, a red light source 121 which is a second light source is not limited to a red light emitting diode. As FIG. 12 shows, red laser emitting devices 255 can also be used as a red light source 121.

In this way, when the red laser emitting devices 255 are used as the red light source 121, like blue laser emitting devices of an excitation light shining device 70, six semiconductor light emitting elements in total are arranged into a matrix of two rows and three columns. Then, as FIG. 12 shows, collimator lenses 256 are disposed individually on respective optical axes of the red laser emitting devices 255. These collimator lenses 256 are collective lenses which convert light emitted from the red laser emitting devices 255 into parallel light. In addition, a group of reflection mirrors 257 is made up of a plurality of reflection mirrors which are arranged in a step-like fashion. The reflection mirrors 257 reduce sectional areas of pencils of light which are emitted from the corresponding red laser emitting devices 255 in one direction for emission to a collective lens 258.

Figure 12:
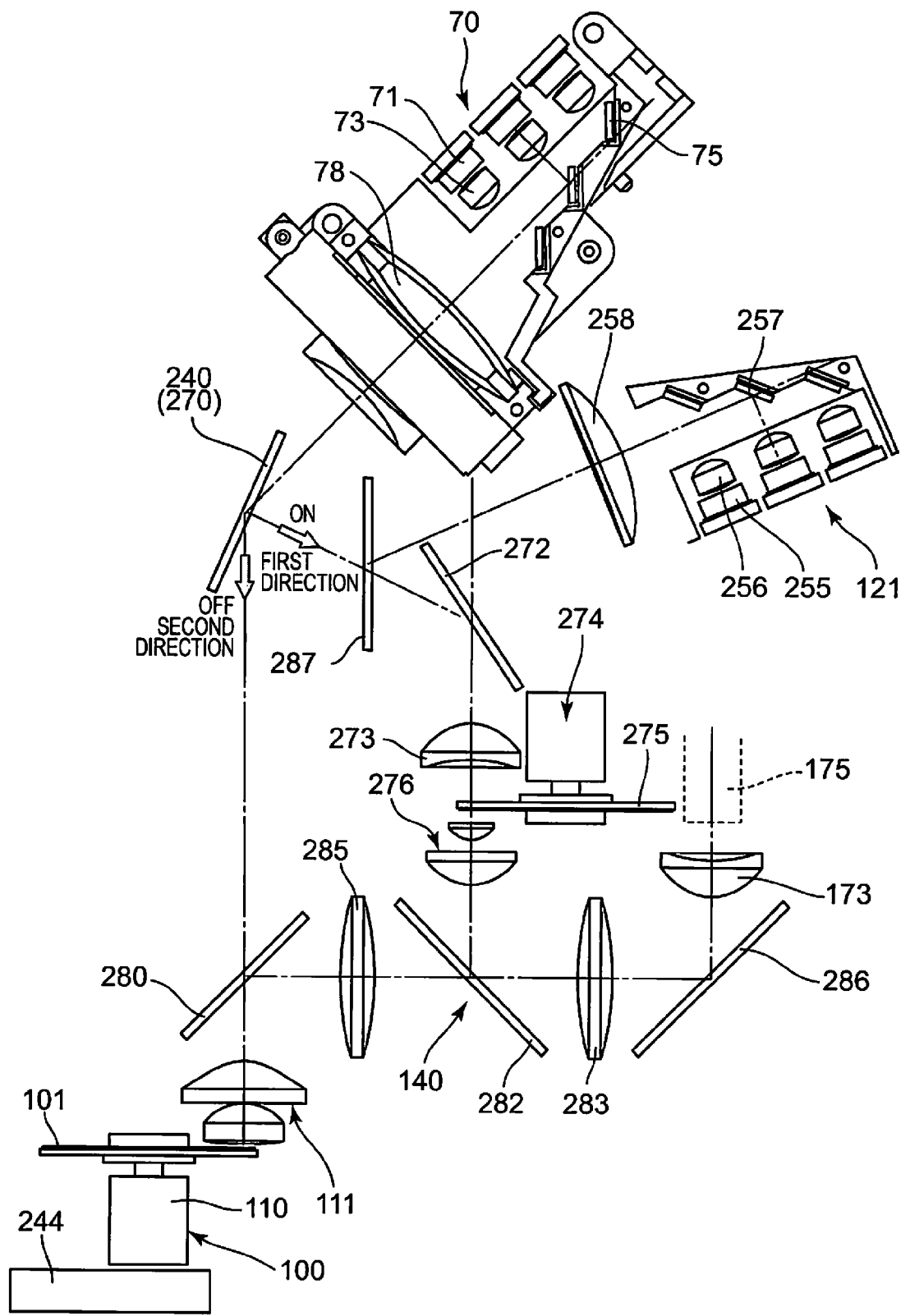
FIG. 12 is an exemplary plan view showing a further configuration example of a light source for the projector according to the embodiment of the invention.

The light emitted from the red laser emitting devices 255 are reflected by a dichroic mirror 287 which reflects red light and transmits blue light as shown in FIG. 12. The red light so reflected travels along the same optical path as that of excitation light which is reflected in a first direction by a reflection angle changing mirror 270 so as to be guided in the direction of a mirror 272.

The red light emitted from the red laser emitting devices 255 and guided in the direction of the mirror 272 is reflected by the mirror 272, passes through a collective lens 273 and is shone on to a diffuse plate 275 of a diffuse device 274 where the red light is converted into red diffuse light. Then, the red diffuse light passes through the diffuse plate 275, further passes through a group of collective lenses 276 and is reflected by a dichroic mirror 282, whereby the optical path thereof is turned by 90 degrees. The red light then passes through a collective lens 283 and is reflected by a mirror 286, whereby the optical path thereof is turned by 90 degrees. The red light then passes through a collective lens 173 so as to be incident on a light tunnel 175, thereby making it possible to form a red segment through which light of red wavelength band is emitted from the light source unit 60.

By adopting this configuration, as FIG. 11 shows, one frame is made up of two sub-frames of a sub-frame 1 and a sub-frame 2. Then, in each sub-frame, the excitation light sources 71 of the excitation light shining device 70, the red light source 121 and the optical path switching device 240 are controlled so as to form segments sequentially. In addition, by forming such segments in a combined fashion, complementary colors of yellow and magenta can be formed.

In addition, the dichroic mirror 284 of the fifth embodiment is compared with the dichroic mirror 287 of the sixth embodiment. The dichroic mirror 284 of the fifth embodiment needs to have a characteristic of transmitting light of red wavelength band and a characteristic of reflecting light of blue wavelength band and light of green wavelength band (a wavelength-selectivity) and needs to be designed so as to have a steep characteristic which enables these characteristics to be switched in a narrow boundary region between light of green wavelength band and light of red wavelength band.

In contrast with the dichroic mirror 284 of the fifth embodiment, the dichroic mirror 287 of the sixth embodiment can be designed to reflect light of red wavelength band and transmit light of blue wavelength band. In a wavelength band of visible light, a green wavelength band exists between a blue wavelength band and a red wavelength band. However, in the sixth embodiment, no light of green wavelength band is incident on the dichroic mirror 287.

Because of this, a characteristic of reflecting light of red wavelength band and a characteristic of transmitting light of blue wavelength band can be designed to be switched in a wide region of the green wavelength band.

Namely, in contrast with the dichroic mirror 284 of the fifth embodiment, the steep characteristic in relation to wavelength selectivity is not required for the dichroic mirror 287 of the sixth embodiment, and therefore, the dichroic mirror 287 of the sixth embodiment can be designed simply, thereby making it possible to suppress design costs to a low level.

In this configuration, the collective lens 173 and the light tunnel 175 may of course be disposed so that light that has passed through the collective lens 283 enters directly the collective lens 173 and the light tunnel 175 with the mirror 286 omitted.

Modified Example of Sixth Embodiment

Further, in a light source unit 60 which adopts a reflection angle changing mirror 270, when red laser emitting devices 255 are adopted as a red light source which is a second light source, a configuration can also be adopted in which the numbers of dichroic mirrors and collective lenses in the optical system are reduced so as to realize a reduction in size of the light source unit 60.

Figure 13:
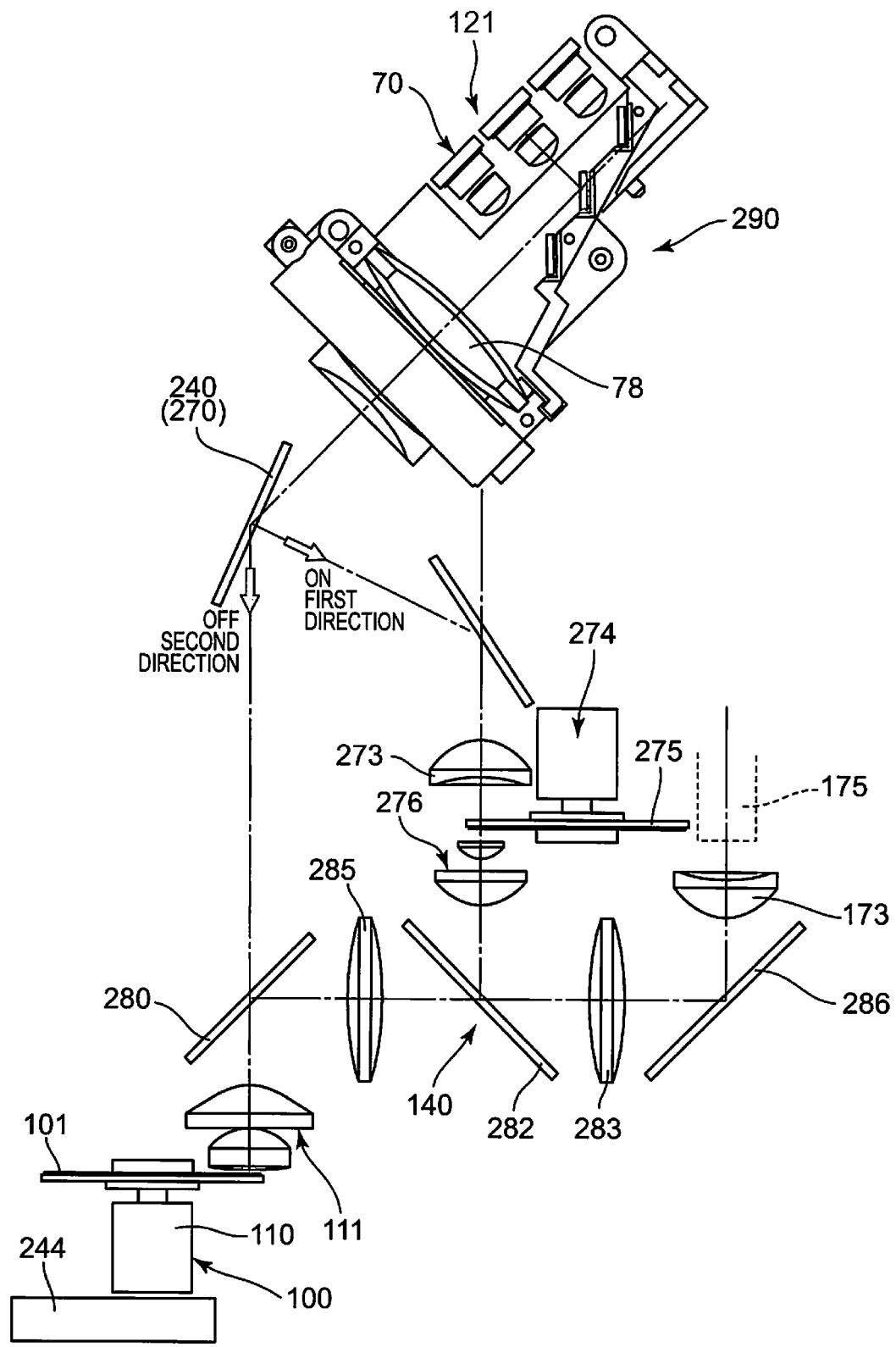
FIG. 13 is an exemplary plan view showing a furthermore configuration example of a light source unit for the projector according to the embodiment of the invention.

Specifically speaking, as FIG. 13 shows, red laser emitting devices 255 are disposed within a two-color laser unit 290 which is generated by disposing the red laser oscillators 255 within the same unit which accommodates excitation light sources 71 as a first light source which are blue laser emitting devices for shining light of blue wavelength band. Namely, the two-color laser unit 290 includes a red light source 121 and an excitation light shining device 70.

The two-color laser unit 290 is formed by arranging six red or blue semiconductor light emitting elements in total into a matrix of two rows and three columns. Then, for example, a configuration may be adopted in which red laser emitting devices 255 are disposed in three upper semiconductor light emitting elements and excitation light sources 71 which are blue laser emitting devices are disposed in three lower semiconductor light emitting elements.

Figure 14:
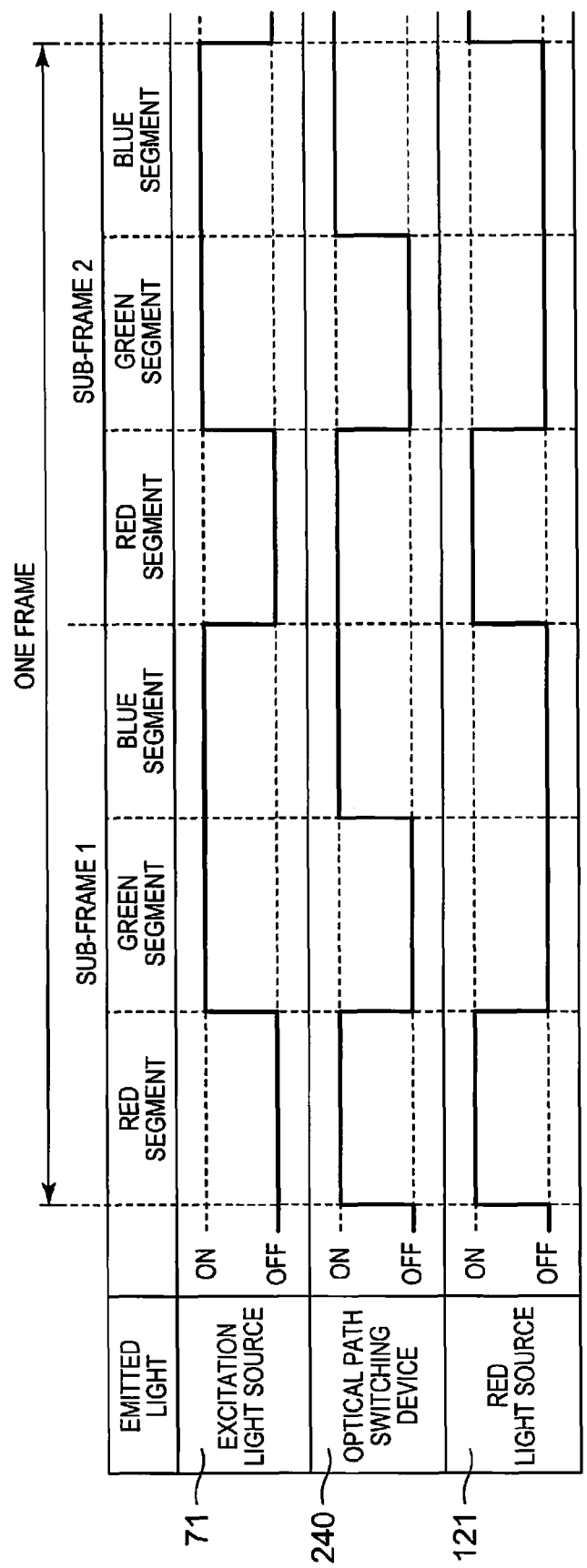
FIG. 14 is an explanatory drawing in relation to a time-sharing control of an optical path switching device for the projector according to the embodiment of the invention.

Then, even with the two-color laser unit 290, as FIG. 14 shows, one frame is made up of two sub-frames of a sub-frame 1 and a sub-frame 2. Then, in each sub-frame, the excitation light sources 71 of the excitation light shining device 70, the red light source 121 and the optical path switching device 240 are controlled so as to form segments sequentially. In addition, in this configuration, a collective lens 173 and a light tunnel 175 may of course be disposed so that light that has passed through a collective lens 283 enters directly the collective lens 173 and the light tunnel 175 with a mirror 286 omitted.

In the embodiment shown in FIG. 12, although the dichroic mirror is disposed on the optical path in the first direction of the blue laser light which is excitation light so as to reflect the red laser light generated by the second light source to the optical path in the first direction so that the red laser light travels along the same optical path as that of the blue laser light, a configuration may be adopted in which a dichroic mirror is disposed between the first light source and the reflection angle changing mirror 270 so that optical axes of the blue light source which is the first light source and the red light source which is the second light source coincide with each other, whereby the blue laser light and the red laser light which are emitted from the dichroic mirror are shone on to the reflection angle changing mirror. In this configuration, individual red, green and blue segments can be sequentially formed through an electric control based on the time chart shown in FIG. 14.

Thus, as has been described heretofore, the function to time-share the colors can be realized electrically by providing the optical path switching device 240 which switches the light emitted from the excitation light sources 71 into the first direction and the second direction in the time-sharing fashion. Therefore, the light source unit 60 and the projector 10 can be provided which can control variation from device to device and variation in colors while the light source unit is in operation.

In addition, the duties in the other segments than the blue segment can be changed freely by controlling the optical path switching device 240, and therefore, the color reproduction capability can be improved by eliminating spokes.

Additionally, in the event that the optical path switching device 240 is made up of the switching diffraction grating 241 which switches the optical path of excitation light by the optical path switching control unit 41*a*, the optical path can be switched while reducing the numbers of components involved in the optical system.

Further, in the event that the optical path switching device 240 is made up of the polarization changing device 250 which changes the polarization direction in the time-sharing fashion and the polarization beam splitter 251 which divides or directs light that has passed through the polarization changing device 250 into the two directions according to the polarization direction of the light, the optical paths along the two direction can be set by the excitation light which is converted into the P-polarized light or S-polarized light.

Furthermore, in the event that the reflection angle changing mirror 270 is used, the optical path of light reflected thereby can easily be switched.

In addition, by providing the diffuse plate 242 on the optical path of light emitted from the excitation light sources 71, the shining of coherent light to the outside of the light source unit can be prevented, and noise such as speckles can be suppressed.

Additionally, by using the blue laser emitting devices as the excitation light sources 71, not only can light of blue wavelength band be generated, but also light of green wavelength band can be generated by use of the luminescent material.

Further, by using the red light emitting diodes and the red laser emitting devices as the red light source 121 functioning as the second light source, the light source unit 60 can be provided which saves electric power.

Furthermore, in the event that the polarization changing device 250 is made up, for example, of the magnetic optical element 252 which is formed by the optical member generated by winding the coil around the glass rod and which is adapted to change the plane of polarization by generating a magnetic field when energized, a high-speed response can be realized, thereby making it possible to suppress color breaking noise.

In addition, in the event that the polarization changing device 250 is made up of the switching polarization rotary element 253 which is formed by the crystal member and which is adapted to implement polarization by being energized, excitation light can be turned in a predetermined polarization direction while saving electric power, which is economical.

Additionally, by providing the rotating device which rotates the luminescent wheel 101, excitation light can be prevented from being shone on to the specific luminescent material, and therefore, the generation of color speckles can be prevented.

Further, by providing the cooling device for cooling the luminescent wheel 101, the deterioration of the luminescent wheel 101 due to heat generated can be prevented.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A light source unit comprising:
   a first light source which shines excitation light of a predetermined wavelength band;
   an optical path switching device which switches in a time-sharing fashion the light shone from the first light source into a first light which is shone in a first direction and a second light which is shone in a second direction which is different from the first direction;
   a light emitting plate on which a luminescent material layer is formed which emits luminescent light of a wavelength band which is different from the wavelength band of the excitation light when receiving the second light; and
   a light guiding optical system which guides the first light and the luminescent light to a same optical path.

2. A light source unit as set forth in claim 1, further comprising:
   an optical path switching control unit which controls the optical path switching device;
   wherein the optical path switching device is a switching diffraction grating which switches an optical path of light based on control by the optical path switching control unit.

3. A light source unit as set forth in claim 1, further comprising:
   an optical path switching control unit which controls the optical path switching device;
   wherein the optical path switching device is a mirror device which switches an optical path of light in a time-sharing fashion based on control by the optical path switching control unit.

4. A light source unit as set forth in claim 1, further comprising:
   an optical path switching control unit which controls the optical path switching device;
   wherein the optical path switching device comprises a polarization changing device which changes a polarization direction of light in a time-sharing fashion based on control by the optical path switching control unit and a polarization beam splitter which divides the light that has passed through the polarization changing device into two directions according to the polarization direction of the light.

5. A light source unit as set forth in claim 4, wherein the polarization changing device is a magnetic optical element which changes a plane of polarization by generating a magnetic field by being energized.

6. A light source unit as set forth in claim 4, wherein the polarization changing device is a switching polarization rotary element which comprises a liquid crystal member and is adapted to change a plane of polarization by being energized.

7. A light source unit as set forth in claim 1, further comprising a diffuse plate disposed on an optical path of the first light.

8. A light source unit as set forth in claim 7, further comprising a rotating device which rotates the diffuse plate.

9. A light source unit as set forth in claim 8, wherein the rotating device comprises a motor.

10. A light source unit as set forth in claim 1, wherein the first light source is a blue laser emitting device, and the luminescent material layer formed on the light emitting plate emits light of a green wavelength band.

11. A light source unit as set forth in claim 1, further comprising:
    a second light source which comprises a semiconductor light emitting element;
    wherein an optical path of light shone from the second light source is guided to an optical path of the luminescent light.

12. A light source unit as set forth in claim 11, wherein the semiconductor light emitting device is a red light emitting diode.

13. A projector comprising:
    the light source unit as set forth in claim 11;
    a display device;
    a light source side optical system which guides light emitted from the light source unit to the display device;

a projection side optical system which projects an image emitted from the display device onto a screen; and a projector control unit which controls the light source unit and the display device.

14. A light source unit as set forth in any of claim 1, further comprising:
- a second light source comprises a semiconductor light emitting element;
- wherein an optical path of light shone from the second light source is guided to an optical path of the first light.

15. A light source unit as set forth in claim 14, wherein the semiconductor light emitting device is a red laser emitting device.

16. A projector comprising:
- the light source unit as set forth in claim 14;
- a display device;
- a light source side optical system which guides light emitted from the light source unit to the display device;
- a projection side optical system which projects an image emitted from the display device onto a screen; and
- a projector control unit which controls the light source unit and the display device.

17. A light source unit as set forth in claim 1, further comprising a rotating device which rotates the light emitting plate.

18. A light source unit as set forth in claim 1, further comprising a cooling device which cools the light emitting plate.

19. A projector comprising:
- the light source unit as set forth in claim 1;
- a display device;
- a light source side optical system which guides light emitted from the light source unit to the display device;
- a projection side optical system which projects an image emitted from the display device onto a screen; and
- a projector control unit which controls the light source unit and the display device.

* * * * *

UNITED STATES PATENT AND TRADEMARK OFFICE
CERTIFICATE OF CORRECTION

| | | |
|---|---|---|
| PATENT NO. | : 8,807,758 B2 | Page 1 of 1 |
| APPLICATION NO. | : 13/324107 | |
| DATED | : August 19, 2014 | |
| INVENTOR(S) | : Takeshi Miyazaki | |

It is certified that error appears in the above-identified patent and that said Letters Patent is hereby corrected as shown below:

In the Claims

Column 21, Line 5; Claims 14, Line 1:

after "in" delete "any of".

Signed and Sealed this
Seventeenth Day of February, 2015

Michelle K. Lee
*Deputy Director of the United States Patent and Trademark Office*